(12) United States Patent  
Clay

(10) Patent No.: US 12,394,418 B2
(45) Date of Patent: Aug. 19, 2025

(54) VEHICLE AUDIO RECORDING SYSTEM

(71) Applicant: Suzette Clay, Gallatin, TN (US)

(72) Inventor: Suzette Clay, Gallatin, TN (US)

( * ) Notice: Subject to any disclaimer, the term of this patent is extended or adjusted under 35 U.S.C. 154(b) by 341 days.

(21) Appl. No.: 18/106,833

(22) Filed: Feb. 7, 2023

(65) Prior Publication Data

US 2024/0265922 A1    Aug. 8, 2024

(51) Int. Cl.
| | | |
|---|---|---|
| *G10L 15/26* | (2006.01) | |
| *B60R 16/027* | (2006.01) | |
| *G06F 3/16* | (2006.01) | |
| *H04H 60/27* | (2008.01) | |
| *H04H 60/58* | (2008.01) | |
| *H04R 3/00* | (2006.01) | |

(52) U.S. Cl.
CPC ............ *G10L 15/26* (2013.01); *B60R 16/027* (2013.01); *G06F 3/165* (2013.01); *H04H 60/27* (2013.01); *H04H 60/58* (2013.01); *H04R 3/00* (2013.01); *H04R 2499/13* (2013.01)

(58) Field of Classification Search
CPC ......... G10L 15/26; G10L 13/00; H04H 60/27; H04H 60/58; B60R 16/027; B60R 11/02; B60R 11/0264; B60R 2011/001; G06F 3/165; G06F 3/04883; H04R 3/00; H04R 2499/13; H04B 1/082; H04M 1/6505
See application file for complete search history.

(56) References Cited

U.S. PATENT DOCUMENTS

| | | |
|---|---|---|
| 5,898,392 A | 4/1999 | Bambini |
| 6,535,804 B1 | 3/2003 | Chun |
| 6,593,848 B1 | 7/2003 | Atkins, III |
| 9,926,010 B2 | 3/2018 | Kim |
| 2004/0022137 A1* | 2/2004 | Campbell ............... B60R 21/02 369/1 |
| 2010/0229207 A1* | 9/2010 | Eckhardt .......... H04N 21/41422 725/75 |
| 2011/0183725 A1* | 7/2011 | Cohen ..................... G10L 15/26 345/169 |
| 2012/0283894 A1 | 11/2012 | Naboulsi |

* cited by examiner

*Primary Examiner* — Yogeshkumar Patel

(57) ABSTRACT

A vehicle audio recording system for recording speech and radio transmissions such that they can be replayed includes a vehicle with a control circuit is mounted therein. An audio system is also mounted in the vehicle and is electrically coupled to the control circuit. The audio system receives and audibly plays radio channels and stored audio files. A memory circuit is electrically coupled to the control circuit. A microphone is mounted within the vehicle and is electrically coupled to the control circuit. And a steering wheel controller is integrated into a central portion of a steering wheel of the vehicle which is electrically coupled to the control circuit. The steering wheel controller includes a dictation input for recording speech captured by the microphone to be stored on the memory circuit.

5 Claims, 4 Drawing Sheets

VEHICLE AUDIO RECORDING SYSTEM

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to speech recording systems for vehicles and more particularly pertains to a new speech recording system for vehicles for recording speech and radio transmissions such that they can be replayed.

(2) Description of Related Art Including Information Disclosed Under 37 CFR 1.97 and 1.98

The prior art relates to speech recording systems for vehicles. Several recording devices are available, but the prior art does not disclose a speech recording system for a vehicle with memory storage and the ability to play back the recordings made by the system.

(h) BRIEF SUMMARY OF THE INVENTION

An embodiment of the disclosure meets the needs presented above by generally comprising a vehicle with a control circuit is mounted therein. An audio system is also mounted in the vehicle and is electrically coupled to the control circuit. The audio system is configured to receive and audibly play radio channels and stored audio files. A memory circuit is electrically coupled to the control circuit. A microphone is mounted within the vehicle and is electrically coupled to the control circuit. And a steering wheel controller is integrated into a central portion of a steering wheel of the vehicle which is electrically coupled to the control circuit. The steering wheel controller includes a dictation input for recording speech captured by the microphone to be stored on the memory circuit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
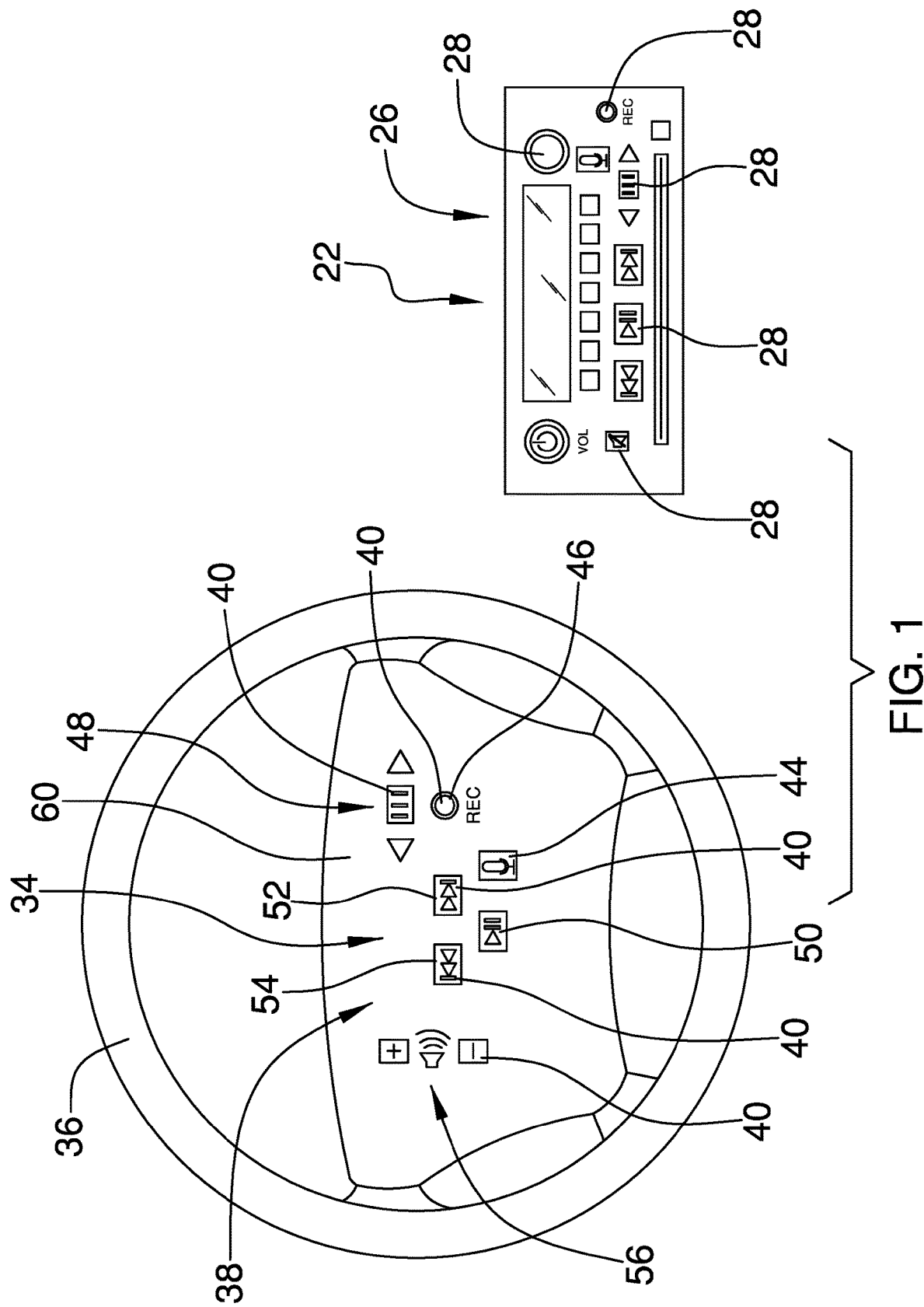
FIG. 1 is a front view of a portion of a vehicle audio recording system according to an embodiment of the disclosure.
Figure 2:
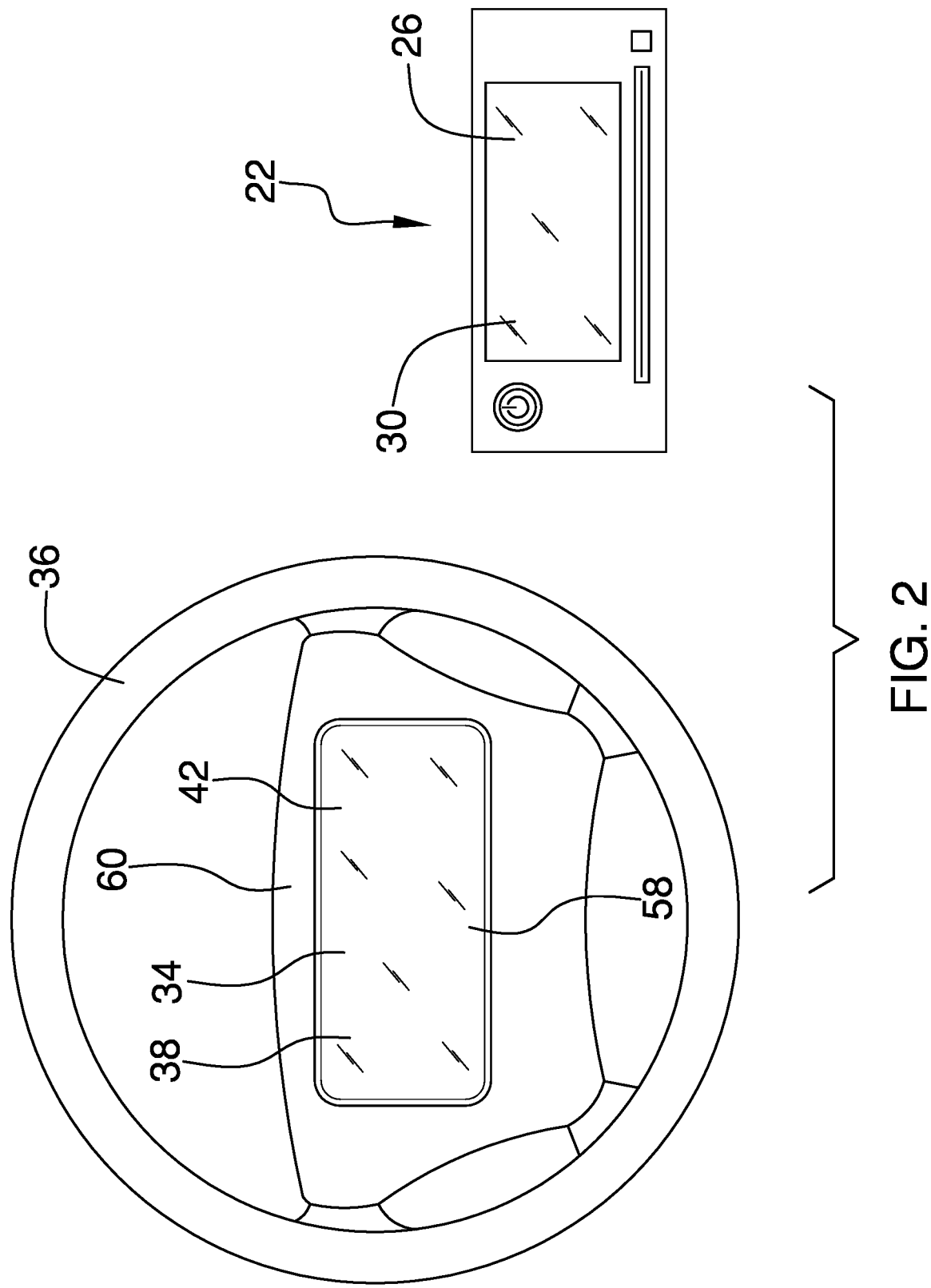
FIG. 2 is a front view of a portion of an alternative embodiment of the disclosure.
Figure 3:
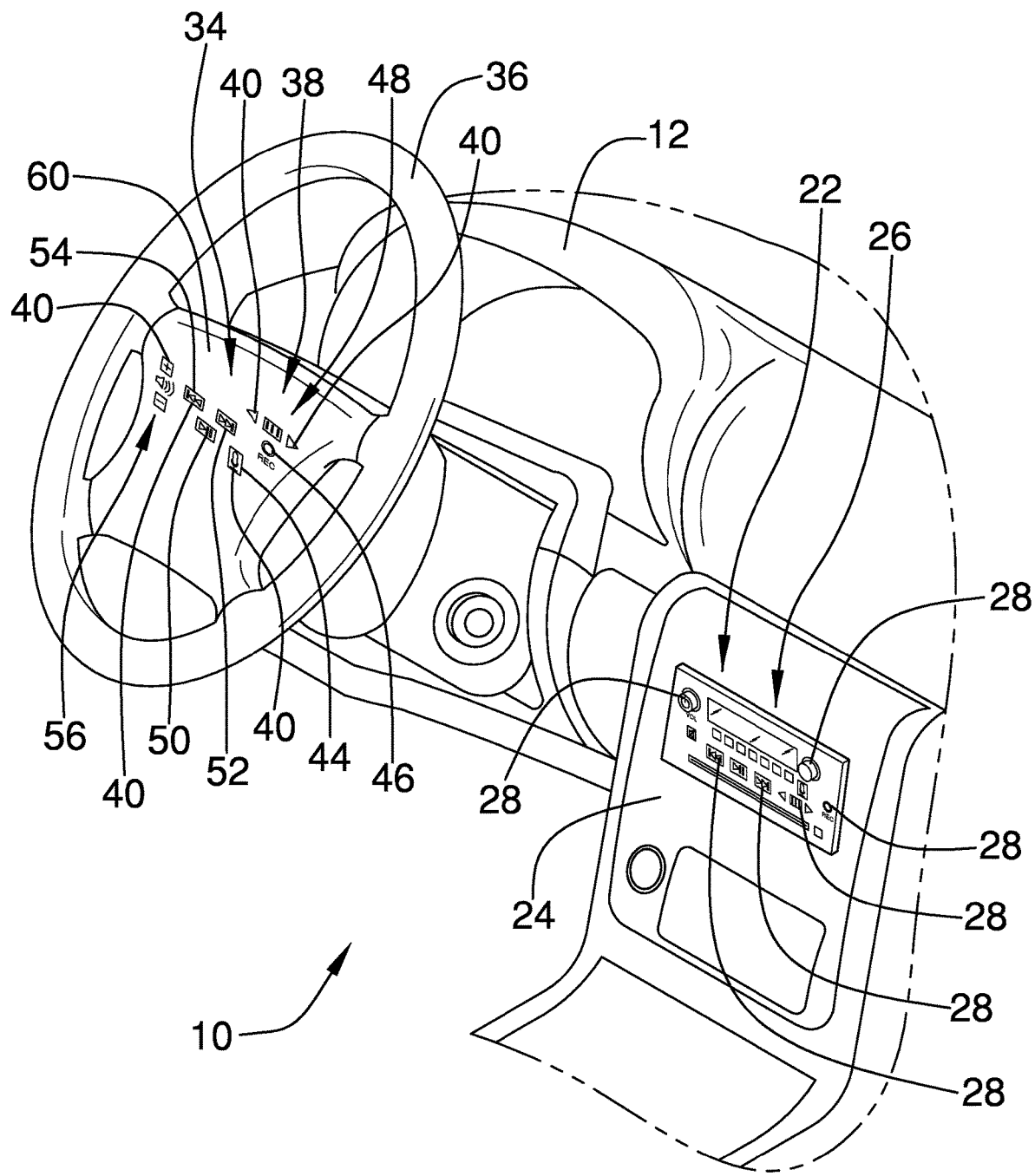
FIG. 3 is an in-use view of an embodiment of the disclosure.
Figure 4:
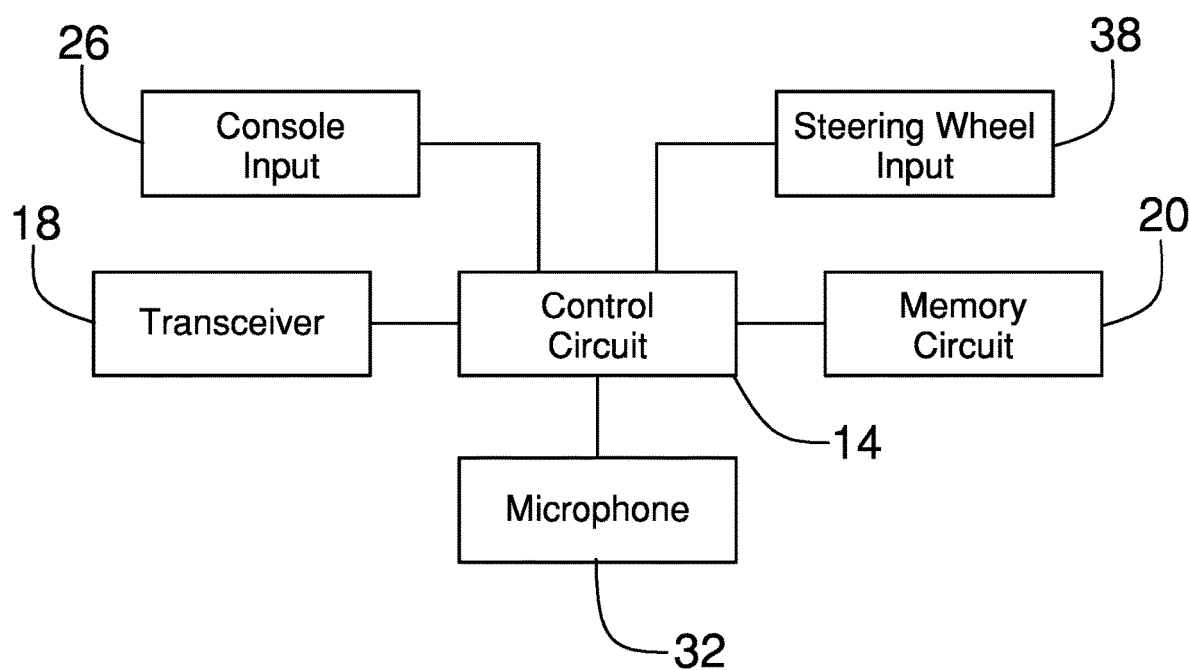
FIG. 4 is a block diagram of an embodiment of the disclosure.

With reference now to the drawings, and in particular to FIGS. 1 through 4 thereof, a new speech recording system for vehicles embodying the principles and concepts of an embodiment of the disclosure and generally designated by the reference numeral 10 will be described.

As best illustrated in FIGS. 1 through 4, the vehicle audio recording system 10 generally comprises a vehicle 12 with a control circuit 14 that is mounted in the vehicle 12. The control circuit 14 may comprise one or more processors with conventional programming used with automobiles. The control circuit 14 may, for example, control lights, heating and cooling, navigation systems, and/or similar functions. An audio system is mounted in the vehicle 12 and is electrically coupled to the control circuit 14. The audio system is configured to receive and audibly play radio channels and stored audio files. "Radio channels" in this detailed description and in the claims is a generic term including communication signals using amplitude modulation (AM) transmission, frequency modulation (FM) transmission, satellite radio services, wireless personal area networks, wireless local area networks, and the like. The audio system further comprises conventional elements of automobile sound systems such as a radio receiver, speakers, and the like.

A transceiver 18 is electrically coupled to the control circuit 14 and is configured to wirelessly communicate with personal computing devices. "Personal computing devices" in this detailed description and in the claims refers to computing devices that store audio files which are able to be transmitted wirelessly and includes laptop computers, desktop computers, mobile phones, tablets, and the like. A memory circuit 20 is also electrically coupled to the control circuit 14. A console controller 22 is coupled to and positioned on a central console 24 of the vehicle 12, and the console controller 22 is electrically coupled to the audio system. The console controller 22 comprises a console input 26 for recording, storing, and playing audio files using the audio system. The console input 26 may include a plurality of buttons 28, a touchscreen 30 with selectable icons, or the like. A microphone 32 is mounted within the vehicle 12 and is electrically coupled to the control circuit 14.

A steering wheel controller 34 is integrated into a central portion 60 of a steering wheel 36 of the vehicle 12. The steering wheel controller 34 is electrically coupled to the control circuit 14 and includes a steering wheel input 38 for recording, storing, and playing audio files using the audio system. Like the console input 26, the steering wheel input 38 may comprise a plurality of buttons 40, a touchscreen 42, or the like. The steering wheel input 38 includes a dictation input 44 wherein actuation of the dictation input 44 records speech captured by the microphone 32 to be stored on the memory circuit 20. The dictation input 44 may be programmed to record speech while being continuously actuated, and to toggle between starting and ending a recording when actuated. The control circuit 14 is programmed to convert the speech into text and transfer the text to a mobile device with the transceiver 18. The control circuit 14 will also store the speech as an audio file that can be stored on the memory circuit 20.

The steering wheel input 38 also includes a live play record input 46 wherein the memory circuit 20 records a currently played broadcast program on the memory circuit 20 when the live play record input 46 is actuated. A "currently played broadcast program" as used in this detailed description and in the claims refers to any radio transmission of an audio communication received by the audio system, including a song, talk show, or news program. The control circuit 14 may be programmed to record a completed communication, e.g., a complete song, if the live play record input 46 is actuated after the communication has already begun. The steering wheel input 38 also includes a destination input 48 wherein actuation of the destination input 48 provides selectable destination folders on the memory circuit 20 for storage of a recorded program or recorded speech.

The steering wheel input 38 may also include inputs for finding or accessing a radio channel. For example, an input for pairing to a device using a wireless personal area network, or another input for searching a set of radio frequencies to find a broadcast radio communication. The steering wheel input 38 may include a play/pause input 50 for playing and pausing a recorded speech or program. The steering wheel input 38 may also include a forward skip input 52 and a backward skip input 54 for skipping forward and backward respectively in playing a recorded speech or program. Skipping may skip to a different track, by a time interval, or the like. A volume input 56 may also be included in the steering wheel input 38 for controlling the volume of recorded speeches or programs during replay. A display screen 58 may also be included in the steering wheel input 38 for displaying menus or other visual information. The display screen 58 may also be the touchscreen 30 integrated with the other functions of the steering wheel input 38.

In use, a user will actuate the dictation input 44 and speak in order to record a speech of the user. The user may actuate the destination input 48 to select a destination folder on the memory circuit 20 and may play back the recorded speech using the conventional interface of the audio system or the steering wheel input 38. The user may also record the currently played broadcast program by actuating the live play record input 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle audio recording system comprising:
   a vehicle;
   a control circuit being mounted in said vehicle;
   an audio system being mounted in said vehicle and being electrically coupled to said control circuit, said audio system being configured to receive and audibly play radio channels and stored audio files;
   a memory circuit being electrically coupled to said control circuit;
   a microphone being mounted within the vehicle and being electrically coupled to said control circuit; and
   a steering wheel controller being integrated into a central portion of a steering wheel of the vehicle, said steering wheel controller being electrically coupled to said control circuit, said steering wheel controller including:
      a dictation input wherein actuation of said dictation input records speech captured by the microphone to be stored on said memory circuit; and
      a destination input being actuatable to select one of a plurality of destination directories on a file system of said memory circuit for storage of recorded speech.

2. The system of claim 1, further comprising a console controller being coupled to and positioned on a central console of the vehicle, said console controller being electrically coupled to said audio system, said console controller comprising a console input.

3. The system of claim 1, further comprising a transceiver being electrically coupled to said control circuit and being configured to wirelessly communicate with personal computing devices, said control circuit being programmed to convert the speech into text and transferring the text to a mobile device with said transceiver.

4. The system of claim 1, further comprising a live play record input wherein the memory circuit records a currently played broadcast program on said memory circuit when said live play record input is actuated, said destination input being actuatable to select one of a plurality of destination directories on a file system of said memory circuit for storage of a recorded program.

5. A vehicle audio recording system comprising:
   a vehicle;
   a control circuit being mounted in said vehicle;
   an audio system being mounted in said vehicle and being electrically coupled to said control circuit, said audio system being configured to receive and audibly play radio channels and stored audio files;

a transceiver being electrically coupled to said control circuit and being configured to wirelessly communicate with personal computing devices;

a memory circuit being electrically coupled to said control circuit;

a console controller being coupled to and positioned on a central console of the vehicle, said console controller being electrically coupled to said audio system, said console controller comprising a console input;

a microphone being mounted within the vehicle and being electrically coupled to said control circuit; and a steering wheel controller being integrated into a central portion of a steering wheel of the vehicle, said steering wheel controller being electrically coupled to said control circuit, said steering wheel controller including:

a live play record input wherein the memory circuit records a currently played broadcast program on said memory circuit when said live play record input is actuated;

a dictation input wherein actuation of said dictation input records speech captured by the microphone to be stored on said memory circuit, said control circuit being programmed to convert the speech into text and transferring the text to a mobile device with said transceiver; and a destination input said destination input being actuatable to select one of a plurality of destination directories on a file system of said memory circuit for storage of recorded speech, said destination input being actuatable to select one of a plurality of destination directories on a file system of said memory circuit for storage of a recorded program.

* * * * *